United States Patent [19]

Dalle Donne et al.

[11] 4,300,983
[45] Nov. 17, 1981

[54] METHOD AND ARRANGEMENT FOR REDUCING THE RADIATION EXPOSURE RISKS IN THE COURSE OF A NUCLEAR REACTOR CORE MELT DOWN ACCIDENT

[75] Inventors: Mario Dalle Donne, Blankenloch-Buchig; Stefan Dorner, Pforzheim; Gustav Schumacher, Karlsruhe, all of Fed. Rep. of Germany

[73] Assignee: Kernforschungszentrum Karlsruhe, Karlsruhe, Fed. Rep. of Germany

[21] Appl. No.: 841,796

[22] Filed: Oct. 13, 1977

[30] Foreign Application Priority Data

Nov. 24, 1976 [DE] Fed. Rep. of Germany ....... 2653258

[51] Int. Cl.³ .............................................. G21C 9/00
[52] U.S. Cl. .................................................... 376/280
[58] Field of Search ..................................... 176/37, 38

[56] References Cited

U.S. PATENT DOCUMENTS

| | | | |
|---|---|---|---|
| 4,036,688 | 7/1972 | Golden et al. | 7/72 |
| 4,113,560 | 9/1978 | Driscoll et al. | 9/78 |
| 4,121,970 | 10/1978 | Albrecht et al. | 176/38 |

FOREIGN PATENT DOCUMENTS 2363844  6/1975  Fed. Rep. of Germany ........ 176/38

OTHER PUBLICATIONS

Handbook of Chemistry, McGraw Hill Book Co. (1961) Lange pp. 264, 306.
The Condensed Chemical Dictionary 8th Ed, Hawley, (1971), Van Nostrand Reinhold Co., pp. 27, 534, 536, 796.

*Primary Examiner*—S. A. Cangialosi

[57] ABSTRACT

A method and arrangement for containing the core melt flowing from a nuclear reactor into a core catcher below the core wherein the core melt is permitted to gradually penetrate layers of a core catcher materials of inorganic reactor soluble oxides or salts disposed in the core catcher which core catcher materials are dissolved by the oxidic part of the core melt, and the molten solution, after solidification and after being cooled down to a temperature at which hydrogen generating reactions do not take place, is leached with water and rinsed out of the core catcher without the need for humans to be present in the reactor containment and to be exposed to radiation.

8 Claims, 2 Drawing Figures

METHOD AND ARRANGEMENT FOR REDUCING THE RADIATION EXPOSURE RISKS IN THE COURSE OF A NUCLEAR REACTOR CORE MELT DOWN ACCIDENT

DESCRIPTION OF THE PRIOR ART

Various proposals have been made with a view to avoiding the penetration of a nuclear reactor core melt flowing from the melting core of a nuclear reactor during a core melt-down accident through a containment surrounding the nuclear reactor. These proposals are mainly based on the attempt to cool the core melt by suitable means in a suitable core catcher. Heat is mainly removed from the core melt surface and it must be removed at such a rate that the core melt is solidified at latest upon reaching the core catcher walls so that its penetration through the reactor containment is impossible. Core catchers of metallic materials are, for example, known which have an inner liner of graphite and which include a cooling system. They are disposed within the reactor containment, and may include means for dividing the core melt into separate amounts in order to prevent the core melt from becoming critical.

The German DOS No. 22 34 744 describes a core catcher arrangement which has a water spray system arranged above the core catcher so as to permit cooling of the core melt during core melt-down with a water spray. Cooling of the core melt with molten metal such as copper, lead or aluminum has also been taken into consideration.

All the coolants proposed so far, however, have serious disadvantages. In particular, they do not dissolve the core melt. Therefore, at one hand, the fission products which are generating a substantial amount of residual heat remain in the core melt that is within only a relatively small volume and, on the other hand, the core melt forms a solid body after solidification which body is hard and difficult to remove mechanically so that it is difficult if not impossible to clean up the site of the accident.

Also, the high concentration of the fission products in the core melt generates high core melt temperatures thereby increasing the risk of penetration of the core melt through the reactor containment and into the environment.

Further, core catchers have been proposed which included concrete and basalt for melting and dissolution by the core melt. These arrangements, however, would after solidification of the core melt, again produce a solid radioactive product, which is difficult if not impossible to remove. In addition, concrete and basalt are relatively complex compounds which may generate unforeseeable reactions during the dissolution process (for example the generation of highly explosive hydrogen). A further proposal suggested to suspend the core melt in molten lead; but this would also result in the formation of a product which is difficult to remove from the reactor containment.

U.S. Patent application Ser. No. 679,221 discloses a core catcher which includes a protective layer of oxides and salts covered by a metal foil. It is the purpose of this layer to reduce the risks of $H_2$ generation so as to avoid possible explosions during a core melt-down accident of a nuclear reactor which is cooled by water, steam or gas. As oxides and salts used in the protective layer the application lists $MgO$, $CaO$, $B_2O_2$, $SiO_2$, borates, phosphates, chromates and carbonates.

During an accident however, the core melt will melt through the single protective layer probably at one or a few points and underflow the protective layer and collect below the protective layer as a whole that is the oxidic as well as the metallic part of the core melt so that—as intended—the metallic part of the core melt is finally completely covered by the protective layer, which, meanwhile, has also melted. It is also possible that a part of the protective layer mixes with a portion of the oxidic part of the core melt thereby forming a compound which has a lower density than the metal melt and therefore forms a mixed layer above the metal melt. In both cases, however, a contact between the metal melt and water or steam is prevented. But in any case, it is difficult to remove the solidified and highly radioactive core melt at the bottom of the core catcher from the reactor containment after a core melt-down accident.

SUMMARY OF THE INVENTION

A method and arrangement for greatly facilitating removal of a core melt from the containment of a nuclear reactor after a core melt-down accident and without the risk of radiation exposure to humans wherein the core melt is permitted to gradually penetrate layers of inorganic, water soluble oxides or salts disposed in a core catcher arranged below a nuclear reactor, whereby the inorganic oxides and salts are dissolved by the oxidic part of the core melt thereby forming a solution melt. The solution melt, after a cool-down period and solidification, at a temperature at which hydrogen generating reactions do not take place, is leached with water and rinsed out of the containment.

The invention will become more readily apparent from the following description of a preferred embodiment thereof shown, by way of example only, in connection with a gas-cooled breeder reactor, in the accompanying drawings wherein:

FIG. 1 shows the bottom part of a reactor containment including a core catcher in accordance with the present invention; and FIG. 2 shows schematically the gradual penetration of the core melt through the layers in the core catcher.

DESCRIPTION OF THE PREFERRED EMBODIMENT

Figure 1:
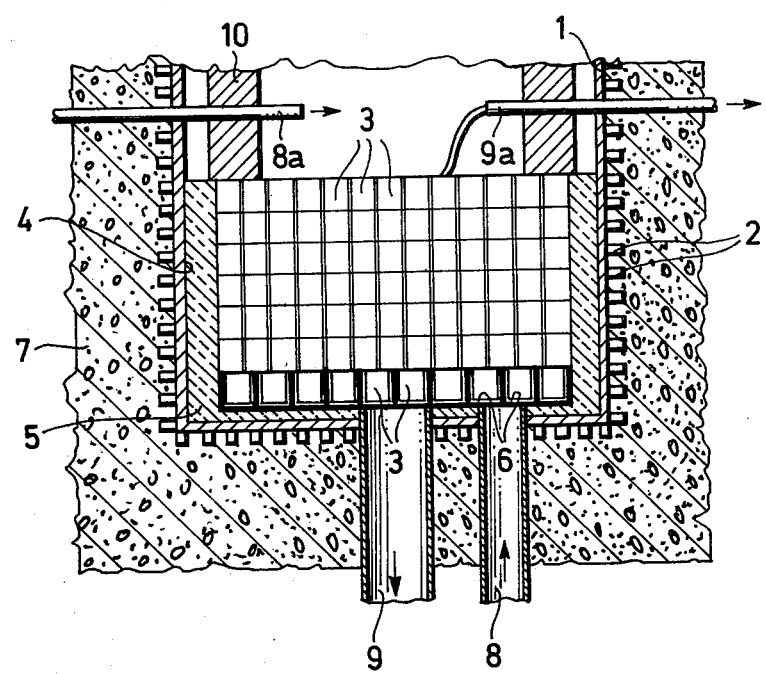

FIG. 1 shows a core catcher 1 provided with cooling pipes 2 and having disposed therein blocks 3 consisting of a wrapper enclosing a water soluble borate. The reactor core catcher is arranged within a reactor containment 7 of, for example, a 1000 MWe gas cooled breeder reactor.

The core catcher 1 has at its inner surface 4 a protective layer 5 consisting preferably of graphite which layer 5, however, is not part of the present invention. The water-soluble borate of the blocks 3 comprises preferably the easily soluble alkali borates i.e. lithium-, potassium-, sodium-, rubidium-, and cesium-borates. In connection with gas cooled breeder reactors, however, $Na_2B_4O_7$, borax is preferred because of its availability and because of its advantageous physical and chemical properties. As a wrapper material, steel is suitable. But also other metals such as iron, nickel and also metal alloys are usable. Through selection of the material of the wrapper or rather their melting points, as well as the size of the blocks 3, the penetration pattern of a core melt can be determined.

The steel included in the core melt of a 1000 MWe gas cooled breeder reactor—if evenly distributed over a core catcher floor of 50 m$^2$—would form a layer of about 1011 cm thickness. In order to facilitate removal of such a metallic layer from the core catcher, there are provided at the bottom of the core catcher 1, that is below the borate blocks, bins 6 of graphite which have side walls extending upwardly above the expected height of the metallic layer. Borate blocks 3 may also be disposed within the bins 6. A heat shield 10 is provided above the borate blocks 3 for the protection of the cooled walls of the core catcher 1 against excessive heat radiation from the molten core materials flowing down into the core catcher 1.

Figure 2:
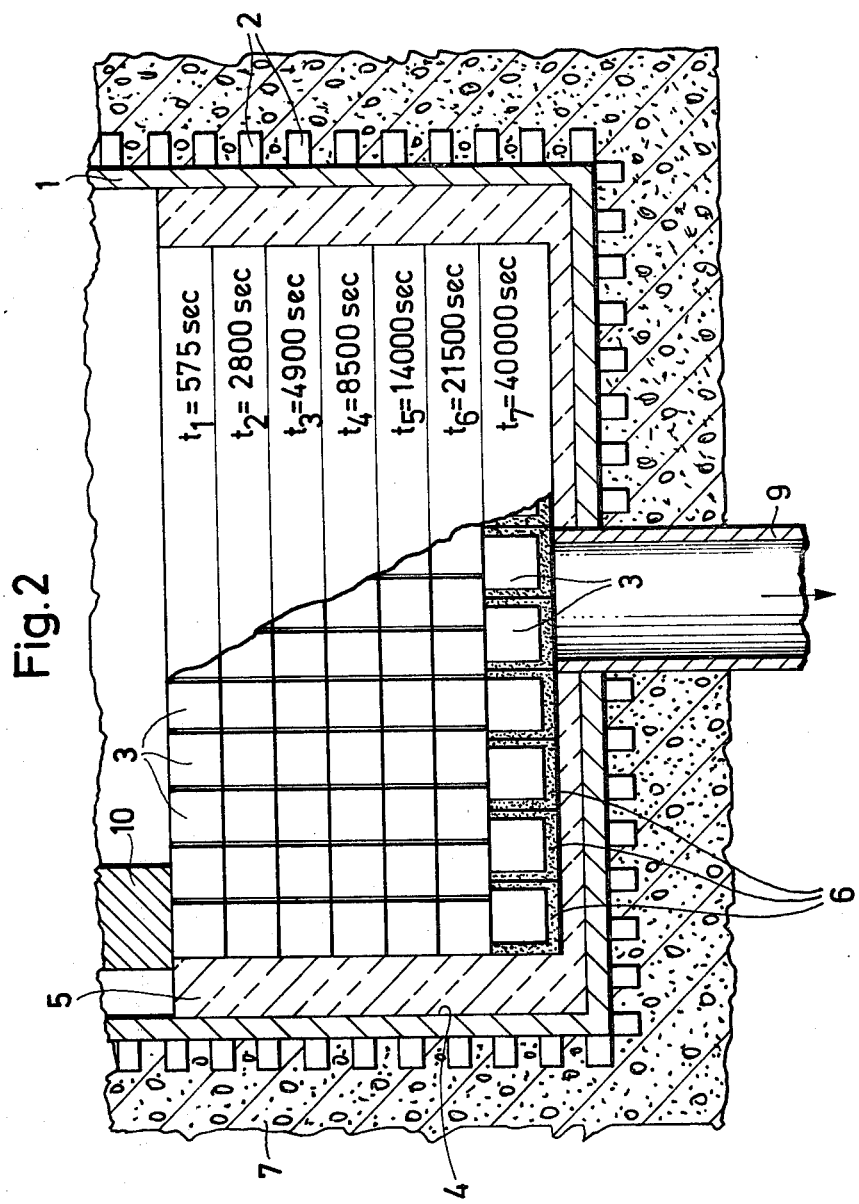

FIG. 2 illustrates the penetration of the core melt through the borate layer in the core catcher. The figure is based on time values calculated for the borate layer to reach the melting point of steel (about 1427° C.) under the assumption of certain conditions.

The weight ratio of sodium borate to the oxidic part of the core melt is preferably selected to be at least about 1:1. For the calculations of penetration times as given in FIG. 2, the ratio of $Na_2B_4O_7$:core melt was assumed to be about 4:3. Because of the relatively low atomic weights of sodium and boron as compared to uranium, the molar or atomic ratio is even greater. Such greater borate to core melt weight ratio is necessary if it is to be insured that the solid solution remains water leachable, even after a complete reaction with the core catcher material.

It is, for example, possible that chemical reactions occur in the core melt which form $Na_3UO_4$ (sodium uranate) and $UO_2(BO_2)_2$ (uranyl-borate). $Na_3UO_4$ immediately absorbs water and $CO_2$ when only exposed to air; when exposed to water total hydrolysis will be the result. $UO_2(BO_2)_2$ is also hydrolized with water by forming $UO_3.2H_2O$. From this it can be learned that, if sufficient water soluble materials are present in the core catcher, the mixture of core catcher materials and core melt can be dissolved or hydrolized. The remainder of the oxidic part of the core melt assumes the state of a fine powder which can be rinsed from the containment as a slurry simply by suction. The dissolution and hydrolization can be achieved in a circuit in which the water is evaporated from the solution, any particles suspended in the solution are removed by filtration, and the water is continuously returned to the containment.

With the method according to the present invention, it becomes unnecessary to provide remotely controlled machinery in the reactor containment for the removal of a core melt after solidification. Instead, there are provided merely water inlets 8, 8a and suction lines 9, 9a which are not necessarily permanently installed but may be introduced into the containment after a core melt-down accident.

Also, the hydrolized core melt when removed from the water solution is obtained in a form well suited for reprocessing.

Although the present invention was developed in connection with a gas-cooled breeder reactor, it should be understood that the invention can also find application, with certain modifications, in connection with water-cooled or sodium-cooled reactors. In the case of a light water reactor, provisions must be made that, during an accident, the water will not wash the water-soluble borate layer away from its location under the core. This can be achieved by fully enclosing the borate layer in the core catcher or rather encapsulating the layer.

In connection with sodium-cooled reactors (such as breeder reactors) a borate is preferred which is essentially inactive chemically with regard to sodium, such as $Na_2BO_2$, sodium metaborate.

In connection with sodium-cooled reactors there must be provisions excluding the in-flows of water into the reactor containment in order to avoid its reaction with the sodium and the formation of hydrogen. With light water reactors no hydrogen or hardly any hydrogen will develop if the borate is in the form of blocks 3 enclosed in wrappers since, after melting of the wrappers of the uppermost blocks, the borate will prevent a direct contact between steel and water or steam.

If, during an accident, only some of the blocks are melted, the undamaged blocks are removed in the normal manner and the remaining damaged blocks are removed by dissolution in a solvent circulated through the core catcher. If a large part of the blocks is damaged it is preferred to first expose the core catcher to the solution for dissolution of the damaged block material. The undamaged blocks can be removed afterwards.

Dissolution of the core melt and core layer material and its removal by pumping the solution out of the containment provides for an easy and safe clean-up operation after a core melt-down accident and this operation can be initiated soon after an accident has occurred.

With the arrangement according to the present invention it is furthermore insured that the decay heat still generated after a core melt-down can safely be absorbed by the core catcher without any additional active means. Also, the exposure of the containment and the reactor to heat and radiation is reduced. However, the additional safety measures have really no influence on the reactor design itself. They are simple and inexpensive. There is no disadvantage generated for the reactor and the containment by inclusion of an arrangement according to the present invention in a reactor installation.

The arrangement according to the invention will also insure that the metallic part of the core melt will have only little contact with any water or steam present in the reactor containment as it readily melts into the top layer of blocks, which, upon melting cover the metallic part of the core melt so as to protect it from any water and steam in the containment. The blocks which as mentioned consist of water soluble alkali borates enclosed in a casing, may be arranged in layers of different thicknesses. Each layer includes preferably the same type or the same mixture of borates. Different layers may include different types of borates or different mixtures of borates.

Different layers may also have blocks of different casing materials. The block casings generally consist of metal or metal alloys such as steel, iron, cast iron, nickel, iron alloys, or nickel alloys. But the casings may also consist of ceramic materials or glasses having a relatively high melting temperature however below the temperature of the core melt.

The amount of core catcher material (alkali borates) arranged in layers in the core catcher is, by weight about equal the amount of the oxidic part of the core melt possibly to be received in the core catcher.

Principally, during a core melt-down accident the molten core material flowing from the core penetrates the core catcher material layer by layer by melting the core catcher materials while being dissolved therein. This process consumes a large amount of heat thus taking up the residual decay heat and cooling the core melt. Once the solution of core material and core catcher materials has become solid and relatively cool, water may be introduced into the core catcher to leach the water soluble core catcher materials (borates) from the solid solution which leaves the oxidic part of the core melt in the form of a powder that may be washed out of the core catcher and sucked out of the reactor containment without the need for humans to be exposed to radiation during such clean-up operations.

We claim:

1. A core catcher arranged in a reactor containment below a nuclear reactor for containing the core melt flowing from the core of the nuclear reactor during a reactor core melt-down accident, said core catcher comprising: a container; means associated with the container for cooling the content of said container; a protective layer disposed on the inner surface of said container; a plurality of superimposed layers of blocks arranged within said container, each of said blocks comprising a wrapper consisting of a metal having a melting point below the temperature of the core melt during a core melt-down accident and enclosing a catcher material which is soluble in the oxidic part of the core melt and, in solution with the oxidic part of the core melt, forms a readily water soluble solution melt; means for admitting water into said container for leaching said water soluble solution melt upon cool-down and solidification to provide a solution; and means for discharging said solution from said container.

2. A core catcher as recited in claim 1, wherein said core catcher material comprises at least one type of water-soluble alkali borate.

3. A core catcher as recited in claim 2, wherein all the blocks of a layer include the same type of core catcher material and wherein the blocks of different layers include different types of catcher materials.

4. A core catcher as recited in claim 2, wherein said container includes an amount of blocks including sufficient alkali borate to provide a weight ratio of about 1:1 with the oxidic part of the core melt which is expected to flow from a core during a core melt-down accident.

5. A core catcher as recited in claim 1, wherein said wrappers consist of a structural material comprising one of a metal and a metal alloy.

6. A core catcher as recited in claim 5, wherein said structural material comprises at least one of the group consisting of steel, iron, cast iron, nickel, iron alloys and nickel alloys.

7. A core catcher as recited in claim 1, wherein the wrappers of said blocks consist of a temperature resistant material comprising ceramics and glasses, whose melting points, however, are below the temperature of the core melt.

8. A core catcher as recited in claim 1, wherein said container includes a series of graphite bins closely arranged side-by-side at the bottom of said container for receiving the metallic part of said core melt, said bins being easily removable from said container together with the metallic part of the core melt after the core melt has cooled down and the solidified solution melt has been leached and rinsed out.

* * * * *